US010431981B2

(12) United States Patent
Moore et al.

(10) Patent No.: US 10,431,981 B2
(45) Date of Patent: *Oct. 1, 2019

(54) SURGE SUPPRESSION SYSTEM FOR MEDIUM AND HIGH VOLTAGE

(71) Applicant: Asator Global Technologies LLC, Mesa, AZ (US)

(72) Inventors: Daryl Moore, Golden, CO (US); Jon Yarusso, Lombard, IL (US)

(73) Assignee: Asator Global Technologies LLC, Mesa, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/653,413

(22) Filed: Jul. 18, 2017

(65) Prior Publication Data

US 2018/0041033 A1 Feb. 8, 2018

Related U.S. Application Data

(63) Continuation of application No. 15/266,535, filed on Sep. 15, 2016, which is a continuation of application
(Continued)

(51) Int. Cl.
*H02H 7/04* (2006.01)
*H02J 3/16* (2006.01)
(Continued)

(52) U.S. Cl.
CPC .............. *H02J 3/16* (2013.01); *H02H 5/005* (2013.01); *H02H 7/26* (2013.01); *H02H 9/005* (2013.01);
(Continued)

(58) Field of Classification Search
USPC .................................................. 361/35, 111
See application file for complete search history.

(56) References Cited

U.S. PATENT DOCUMENTS

| | | | |
|---|---|---|---|
| 1,932,088 A | 10/1933 | Searing | |
| 2,733,388 A | 1/1956 | Rechten et al. | |

(Continued)

FOREIGN PATENT DOCUMENTS

| | | |
|---|---|---|
| EP | 2219277 A1 | 8/2010 |
| JP | 2012-503467 A | 2/2012 |

(Continued)

OTHER PUBLICATIONS

Characteristics of Different Power Systems Neutral Grounding Techniques: Fact & Fiction, D.D. Shipp, Westinghouse Electric Corp., Pittsburgh, PA and F.J.Angeline, Westinghouse Electric Corp., Philadelphia, PA, 1988.

(Continued)

*Primary Examiner* — Ronald W Leja
(74) *Attorney, Agent, or Firm* — Hunton AK LLP

(57) ABSTRACT

A system of surge suppressor units is connected at multiple locations on a power transmission and distribution grid to provide grid level protection against various disturbances before such disturbances can reach or affect facility level equipment. The surge suppressor units effectively prevent major voltage and current spikes from impacting the grid. In addition, the surge suppressor units include various integration features which provide diagnostic and remote reporting capabilities required by most utility operations. As such, the surge suppressor units protect grid level components from major events such as natural geomagnetic disturbances (solar flares), extreme electrical events (lightning) and human-generated events (EMPs) and cascading failures on the power grid.

17 Claims, 12 Drawing Sheets

Related U.S. Application Data

No. 14/931,060, filed on Nov. 3, 2015, now Pat. No. 9,450,410, which is a continuation of application No. PCT/US2015/035305, filed on Jun. 11, 2015.

(60) Provisional application No. 62/010,746, filed on Jun. 11, 2014.

(51) Int. Cl.
*H02H 5/00* (2006.01)
*H02H 7/26* (2006.01)
*H02H 9/00* (2006.01)
*H02J 3/18* (2006.01)
*H02J 3/38* (2006.01)
*H02J 3/46* (2006.01)

(52) U.S. Cl.
CPC ............ *H02J 3/18* (2013.01); *H02J 3/382* (2013.01); *H02J 3/46* (2013.01)

(56) References Cited

U.S. PATENT DOCUMENTS

| | | | |
|---|---|---|---|
| 2,745,991 A | 5/1956 | Seymour | |
| 3,343,080 A | 9/1967 | Fox | |
| 3,401,272 A | 9/1968 | Rosa | |
| 3,450,981 A | 6/1969 | Fletcher | |
| 3,745,416 A | 7/1973 | Thanawala | |
| 3,764,855 A | 10/1973 | Beachley | |
| 4,053,820 A * | 10/1977 | Peterson | H02J 3/01 307/3 |
| 4,200,836 A | 4/1980 | Okada et al. | |
| 4,385,338 A | 5/1983 | Hasse et al. | |
| 4,868,481 A | 9/1989 | Owen | |
| 4,953,071 A | 8/1990 | Lipman | |
| 5,012,382 A | 4/1991 | Carpenter et al. | |
| 5,119,266 A | 6/1992 | Petry | |
| 5,818,126 A | 10/1998 | Mohan | |
| 6,288,917 B1 | 9/2001 | Redburn et al. | |
| 6,888,709 B2 | 5/2005 | Princinsky et al. | |
| 6,920,027 B1 | 7/2005 | Torres | |
| 7,489,485 B2 * | 2/2009 | A F Klercker Alakula | H01F 27/38 361/35 |
| 7,558,032 B2 | 7/2009 | Piasecki et al. | |
| 7,629,786 B2 | 12/2009 | Lee | |
| 8,446,701 B2 | 5/2013 | Princinsky et al. | |
| 8,816,527 B1 * | 8/2014 | Ramsay | H02J 3/26 307/14 |
| 2003/0206391 A1 | 11/2003 | Princinsky et al. | |
| 2003/0210135 A1 | 11/2003 | Cern | |
| 2009/0303651 A1 | 12/2009 | Princinsky et al. | |
| 2009/0309425 A1 | 12/2009 | Princinsky et al. | |
| 2010/0097734 A1 | 4/2010 | Birnbach | |
| 2010/0195256 A1 | 8/2010 | Birnbach | |
| 2011/0013323 A1 * | 1/2011 | Hyde | H02H 7/26 361/54 |
| 2011/0090606 A1 | 4/2011 | Ramirez et al. | |
| 2011/0092158 A1 | 4/2011 | Plamondon | |
| 2012/0119585 A1 | 5/2012 | Park | |
| 2012/0236442 A1 | 9/2012 | Satyanarayana | G05F 1/70 361/35 |
| 2014/0266154 A1 * | 9/2014 | Lavoie | G01R 21/00 324/105 |
| 2014/0312859 A1 * | 10/2014 | Ramsay | H02J 3/26 323/247 |
| 2015/0043108 A1 | 2/2015 | Taylor | |
| 2015/0124356 A1 | 5/2015 | Ramirez | |
| 2015/0222198 A1 | 8/2015 | Dourbal | |
| 2015/0311697 A1 | 10/2015 | Faxvog et al. | |
| 2015/0316606 A1 * | 11/2015 | Oak | G01R 31/2834 324/537 |
| 2017/0052222 A1 * | 2/2017 | Pasdar | G01R 31/085 |
| 2018/0115159 A1 * | 4/2018 | Lemez | H02J 3/00 |
| 2018/0145504 A1 * | 5/2018 | Kovan | H01F 27/34 |

FOREIGN PATENT DOCUMENTS

| | | |
|---|---|---|
| JP | 2013-504297 A | 2/2013 |
| RU | 1834601 C | 5/1995 |
| WO | 2010/047890 A2 | 4/2010 |

OTHER PUBLICATIONS

Resistive Grounding Techniques, Martin Glover, Post Glover Resistors, Incorporated, Erlanger, KY, no date.
PCT International Search Report and Written Opinion; International application No. PCT/US2015/035305; dated Sep. 15, 2015.

* cited by examiner

Voltages:

A. No Ground Fault, Voltages Are:
   Phase to Phase = 480 Volts
   Phase to Ground = 277 Volts A. Ground Fault on One Phase, Typical
   Voltages Are:
   Phase to Phase (Ungrounded Phases) = 480 Volts
   Phase to Ground (Ungrounded Phases) = 480 Volts
   Phase to Ground (Grounded Phase) = o Volts

SURGE SUPPRESSION SYSTEM FOR MEDIUM AND HIGH VOLTAGE

CROSS-REFERENCE TO RELATED APPLICATIONS

The present application is a continuation of U.S. patent application Ser. No. 15/266,535, filed on Sep. 15, 2016, which is a continuation of U.S. patent application Ser. No. 14/931,060, filed on Nov. 3, 2015 (now U.S. Pat. No. 9,450,410), which is a continuation of International Application No. PCT/US2015/035305, filed on Jun. 11, 2015, which claims benefit of U.S. Provisional Patent Application No. 62/010,746, filed on Jun. 11, 2014, the disclosures of all of which are incorporated herein by reference in their entirety.

FIELD OF THE INVENTION

The invention relates to a surge suppression system for medium and high voltage systems of a power grid.

BACKGROUND AND SUMMARY

Current surge suppression systems have been developed to protect equipment from voltage transients on one side of a three-phase power supply bus used in industrial settings such as in plants, factories, or other large scale systems. In one known voltage surge suppressor, three single-phase transformers are provided with terminals that are each connected through a fused disconnect to a respective single-phase power supply on the power-supply bus. This surge suppressor protects against voltage transients, which can severely damage or destroy equipment connected to the effected three phase circuit or can cause power outages throughout the plant. The surge suppressor circuit operates as a surge and fault protector for any equipment on the power bus. This surge suppressor system is usable with 480 volt distribution systems powered by a 2000 to 3000 kVA ungrounded delta power transformer that feeds approximately 1000 ft of bus duct, so as to generally have about 1 to 3 Amperes of charge current. This charge current may generally be just over 2 Amperes by actual amperage determined by readings in the field, wherein the variations are due to the lengths of the feeder cable and bus duct as well as the number and size of the electric motors and power factor correction capacitors operating at any given time. More typically, resistance grounding circuits constantly bleed this charge to ground to help prevent grounding problems. The known surge suppressor is connected to the bus bars and does not bleed this energy to ground, but uses this charge energy to help stabilize and balance the phase voltages to ground.

This known surge suppressor is installed in and protects equipment connected to a power supply bus at the facility level. However, there is a need for a surge suppressor system for medium and high voltage electrical systems on the grid located outside of and remote from an industrial bus bar power supply system.

A power grid is comprised of many components that are generically described as generators, transformers, transmission and distribution wires and controls. Generators are driven by many forms of energy such as coal, natural gas, nuclear fission, hydro, solar and even wind to name a few. Once power is created at a relatively low voltage around 6,000 volts it is stepped up to high voltage (often in the hundreds of thousands) using large power transformers (LPTs) which allow the electricity to be more effectively delivered over miles of high tension (transmission) wires. Once the electricity reaches the general area where it will be used it is then stepped back down closer to the final voltage at sub/distribution stations. Distribution lines carry near-low voltage electricity on roadside power poles or underground to the final transformer before being delivered into buildings for use.

The present invention is a surge suppressor system that improves upon existing phase adder circuit products, is designed to provide grid-level protection to residences and industrial facilities prior to delivery of the power to these structures so they can withstand higher voltages, provide monitoring and communication from remote settings, and provide more robust installation platforms, and configures the system of surge protection devices in parallel to protect grid level applications on both sides of a power system where the need exists to step power either up or down.

On a medium or high voltage system, the current invention would be configured to handle large and rapid energy "drain offs", prevent interference from high voltage/high magnetic flux, allow remote performance maintenance, and increase protection, as required, from physical attacks and severe over voltages. When the invention is installed in parallel with critical grid infrastructure, the components of the grid are protected against:

Transients: An impulsive transient is what most people are referring to when they say they have experienced a surge or a spike. Many different terms, such as bump, glitch, power surge, and spike have been used to describe impulsive transients. Causes of impulsive transients include lightning, poor grounding, the switching of inductive loads, utility fault clearing, and Electrostatic Discharge (ESD). The results can range from the loss (or corruption) of data to physical damage of equipment. Of these causes, lightning is probably the most damaging. The surge suppressor devices of the current invention provide grid-level protection against such transients.

Interruptions: An interruption is defined as the complete loss of supply voltage or load current. The causes of interruptions can vary but are usually the result of some type of electrical supply grid damage, such as lightning strikes, animals, trees, vehicle accidents, destructive weather (high winds, heavy snow or ice on lines, etc.), equipment failure, or a basic circuit breaker tripping. While the utility infrastructure is designed to automatically compensate for many of these problems, it is not infallible.

Sag/Under-voltage: A sag is a reduction of AC voltage at a given frequency for the duration of 0.5 cycles to 1 minute's time. Sags are usually caused by system faults and are also often the result of switching on loads with heavy startup currents.

Swell/Over-voltage: A swell is the reverse form of a sag, having an increase in AC voltage for a duration of 0.5 cycles to 1 minute's time. For swells, high-impedance neutral connections, sudden (especially large) load reductions, and a single-phase fault on a three-phase system are common sources.

Frequency Variations: There are all kinds of frequency issues from offsets, notching, harmonics, and inter-harmonics; but these are all conditions that occur largely in the end user's power system. These variations happen because harmonics from loads are more likely in smaller wye type systems. The high frequency variations that may lead to massive interconnected grid failure would come from the sun or enemy attack. Damage to only a few key infrastructure components could result in prolonged blackouts and collateral damage to adjoining devices. Solar flares are natural occurrences that vary in severity and direction. This "solar weather" is sent out from the surface of the sun throughout our solar system in all directions. These flares contain large amounts of magnetic energy and depending on how they hit the earth can cause component damage on the surface or by temporarily changing the properties of the planet's magnetic core. Either way, a direct hit of large proportion could cause equipment failure and black out entire regions. Electromagnetic Pulses (EMP) can be used in similar fashion but directed by enemy combatants in the form of a high altitude nuclear explosion. A well-executed detonation over Cincinnati, Ohio could black out 70% of the American population. Damage to large power transformers or generators could take months to repair. The high frequency disturbance of nuclear explosions can destroy unprotected components much like an opera singer's voice can break a glass. The magnitude of each disturbance may depend on the source but each can be mitigated effectively through the use of a phased voltage stabilization system such as the invention.

Current surge suppression technology may attempt to address these disturbances on the facility side of the power distribution system, so as to directly protect equipment in a facility, and also at a grid level but these technologies possess drawbacks in protecting against these disturbances.

As one example of a known surge suppression technology, capacitors are thin conductors separated by even thinner layers of insulation. Capacitors have a design rating for current and voltage. If this rating is not exceeded they will typically operate for 10 to 15 years. One high voltage spike may (and generally will) cause catastrophic failure of capacitors. In factories with 4,000 power factor correction capacitors, it is not uncommon to have 300 to 500 capacitors fail each year due to high harmonic current or high voltage spikes.

In another example, SPD (Surge Protective Devices) are solid state devices constructed in various sizes. Like capacitors, their ratings are also in current and voltage. When the MOV (Metal Oxide Varistor) is hit with many low-level voltage spikes it degrades, and the "clamping voltage" will rise as the MOV breaks down, allowing the clamping voltage to continue to rise until it no longer protects the equipment it was installed to protect. When a voltage spike hits the MOV above the rated voltage, it starts to conduct thousands of amps to ground, causing noise on the ground system and very high heat within the SPD. If the event is longer than a few millionths of a second, the MOV could be destroyed, and therefore would no longer protect the equipment it was installed to protect.

Further, Faraday cages have been used for many years to house and protect computer hardware and sensitive data in factories, as well as some government and military buildings. They recently have been touted as a solution to solar flares, lightning and EMP pulse issues. However, most buildings are not built within a metal enclosure and it is difficult and expensive to properly design and build these enclosures. Most automobiles, trucks, trains and planes are totally enclosed by metal, but they offer no protection from any of these events. By design, the metal enclosure must have a suitable solid ground connection as it relies heavily on enclosing and shielding the sensitive electrical equipment and removing the energy by draining it to ground. The power company uses the Faraday cage design in some of their grid tie substations. They are extremely large and expensive.

The greatest threat to the grid/LPTs is the presence of an electromagnetic pulse (EMP) or geomagnetic disturbance (GMD), the latter would originate as a solar flare and the prior would be from enemy weaponry. Either threat could cause an overworked LPT to be saturated with power and cause the transformer to burn out. With an EMP, saturation could happen in less than a second so detection systems are worthless.

GMD is slower to cause damage so detection systems could reduce the load on a transformer which could allow it to ride out the GMD incident. This brown out or temporarily blacked out condition could last minutes, hours or days depending on the severity of the solar storm. In the case of the 1869 Carrington Event the Earth was pummeled with solar magnetic energy for nearly a month. While the grid could survive such an event if properly managed it would hardly be well received by citizenry to be without power that long.

Simply, Large Power Transformers cannot be protected with old technology like Faraday Cages. The hundreds of miles of wire that connect the LPT to sub stations way down the line act like antennae and harvest EMP with such efficiency that the Faradays would have no value. Surge protecting devices are not fast enough to arrest an EMP which occurs in a millionth of a second or handle the massive electron flow that occurs at the transmission level without allowing current bleed through to the LPT which would ultimately have the same effect as an unprotected system. Grounding systems would try to route surplus current from an EMP to earthen ground probes or mats but that excess energy would likely find its way back into the power system through the ground bus and result in burnout as well.

The present invention relates to a system of surge suppressor units connected at multiple locations on the grid to provide grid level protection against various disturbances before such disturbances can reach or affect facility level equipment. The effect of the invention is significant for protecting grid level applications. With the unique application and design of the present application, the surge suppressor units of the present invention would effectively prevent major voltage and current spikes from impacting the grid. In addition, the surge suppressor units included various integration features which provide diagnostic and remote reporting capabilities required by most utility operations. As such, the surge suppressor units protect the grid level components from major events such as natural geomagnetic disturbances (solar flares), extreme electrical events (lightning) and human-generated events (EMPs) and cascading failures on the power grid. The invention also provides significant protection against arc flashes and reduces voltage harmonics that exists in "normal" grid operations.

The reporting features of the inventive surge suppressor unit are also unique to protecting medium and high voltage systems that are often in remote or isolated settings. Unlike devices designed to protect local low voltage equipment and infrastructure, real time diagnostic reporting from the surge suppressor unit is critical to ensure it is working effectively and providing the continuous protection needed to protect power systems like the US power grid.

As discussed, various known technologies (such as MOVs, Faraday cages, even similar devices designed with fused disconnects) attempt to also correct voltage imbalances. These devices either do not provide the scalability to the voltage requirements at the grid level or "burn out" when significant voltage is applied. These technologies also do not provide reporting, remote diagnostics, or protection from ancillary dangers such as arc flashes or localized voltage overflow. The surge suppressor system of the present invention provides each of these benefits and is also completely scalable for various grid level applications.

Other objects and purposes of the invention, and variations thereof, will be apparent upon reading the following specification and inspecting the accompanying drawings.

Figure 1A:
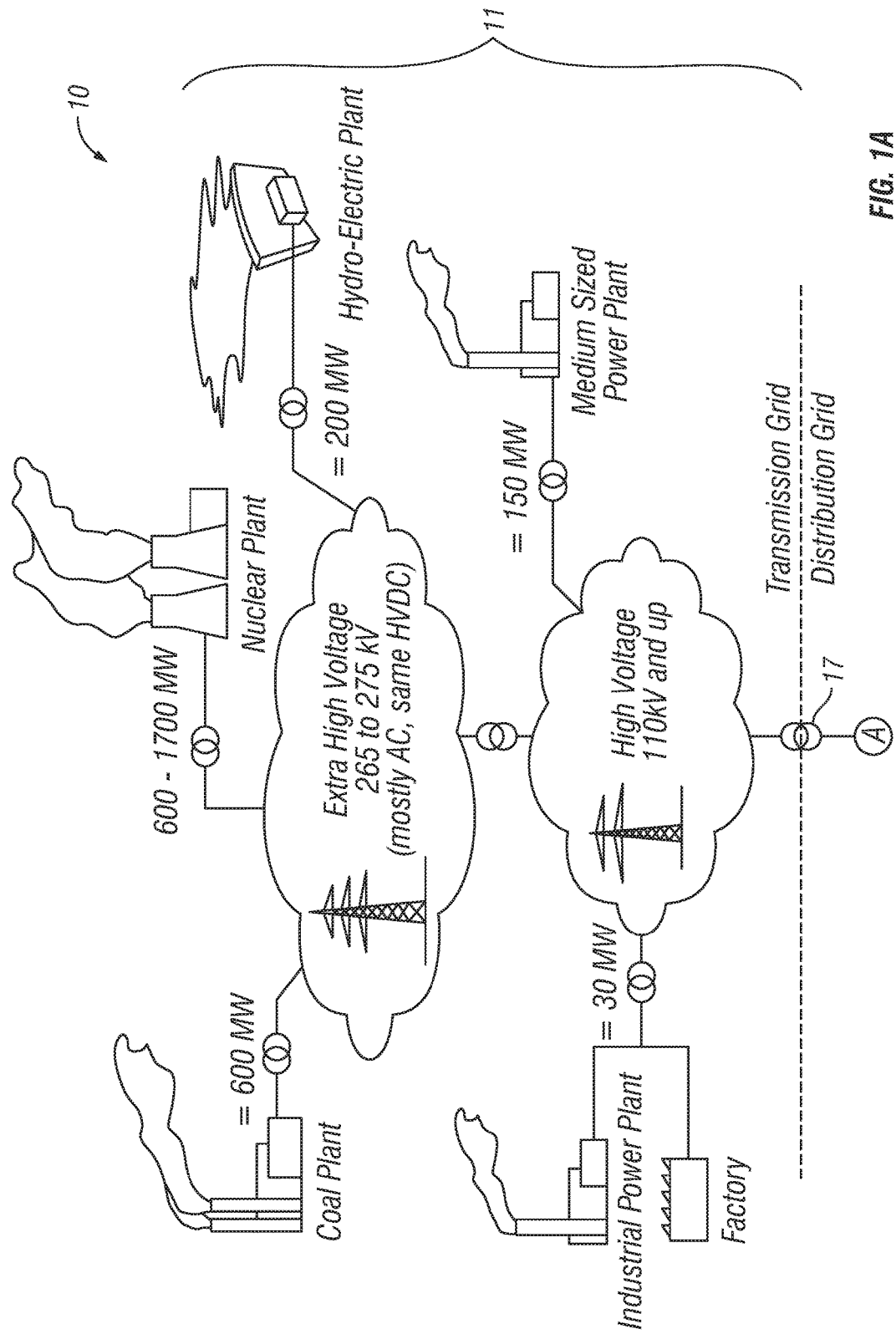
FIG. 1A is a diagrammatic view of power grid interfaces with a system of surge suppressor units connected thereto at various locations on the electrical supply grid.
Figure 1A:
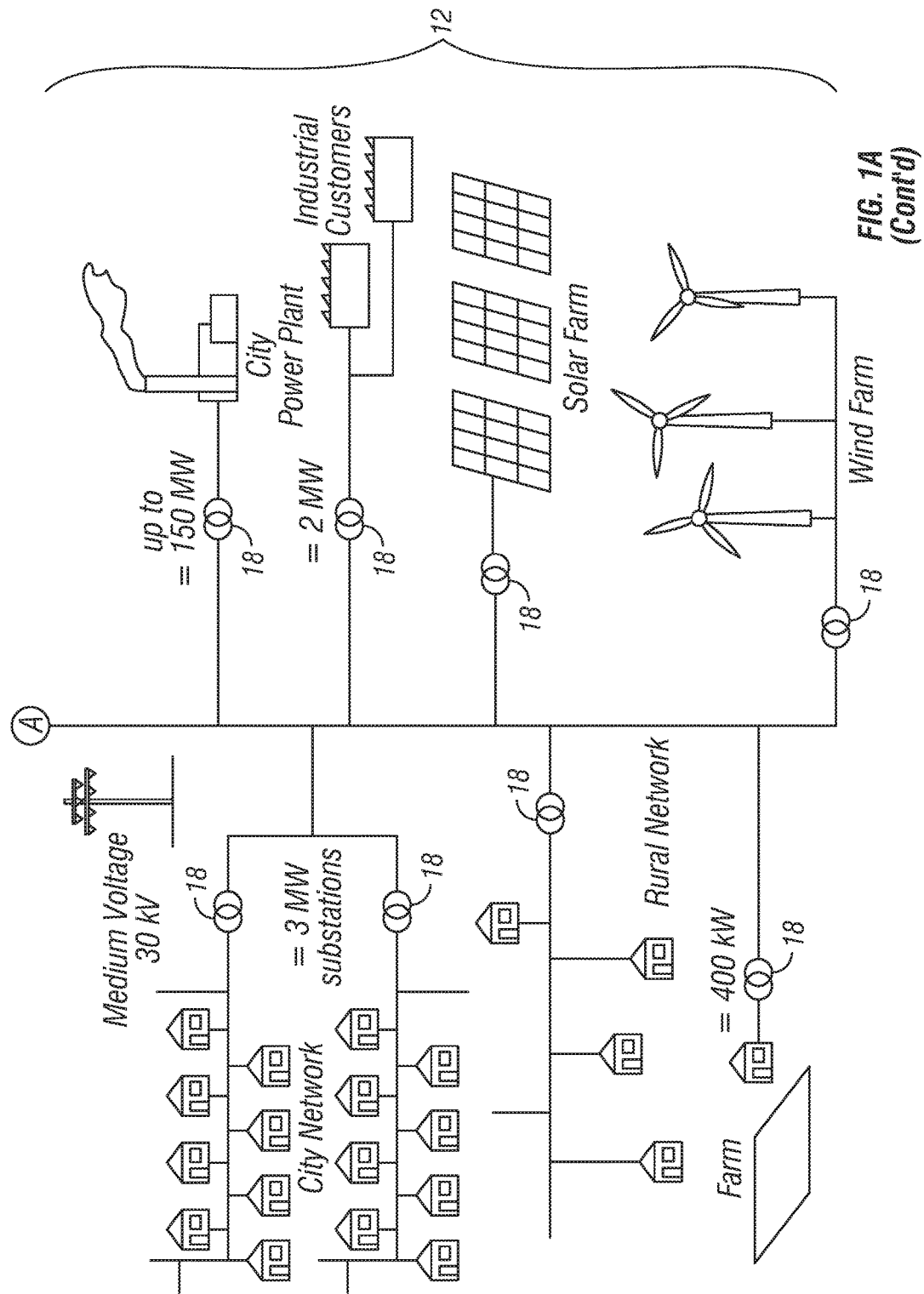

Certain terminology will be used in the following description for convenience and reference only, and will not be limiting. For example, the words "upwardly", "downwardly", "rightwardly" and "leftwardly" will refer to directions in the drawings to which reference is made. The words "inwardly" and "outwardly" will refer to directions toward and away from, respectively, the geometric center of the arrangement and designated parts thereof. Said terminology will include the words specifically mentioned, derivatives thereof, and words of similar import.

DETAILED DESCRIPTION

Figure 1B:
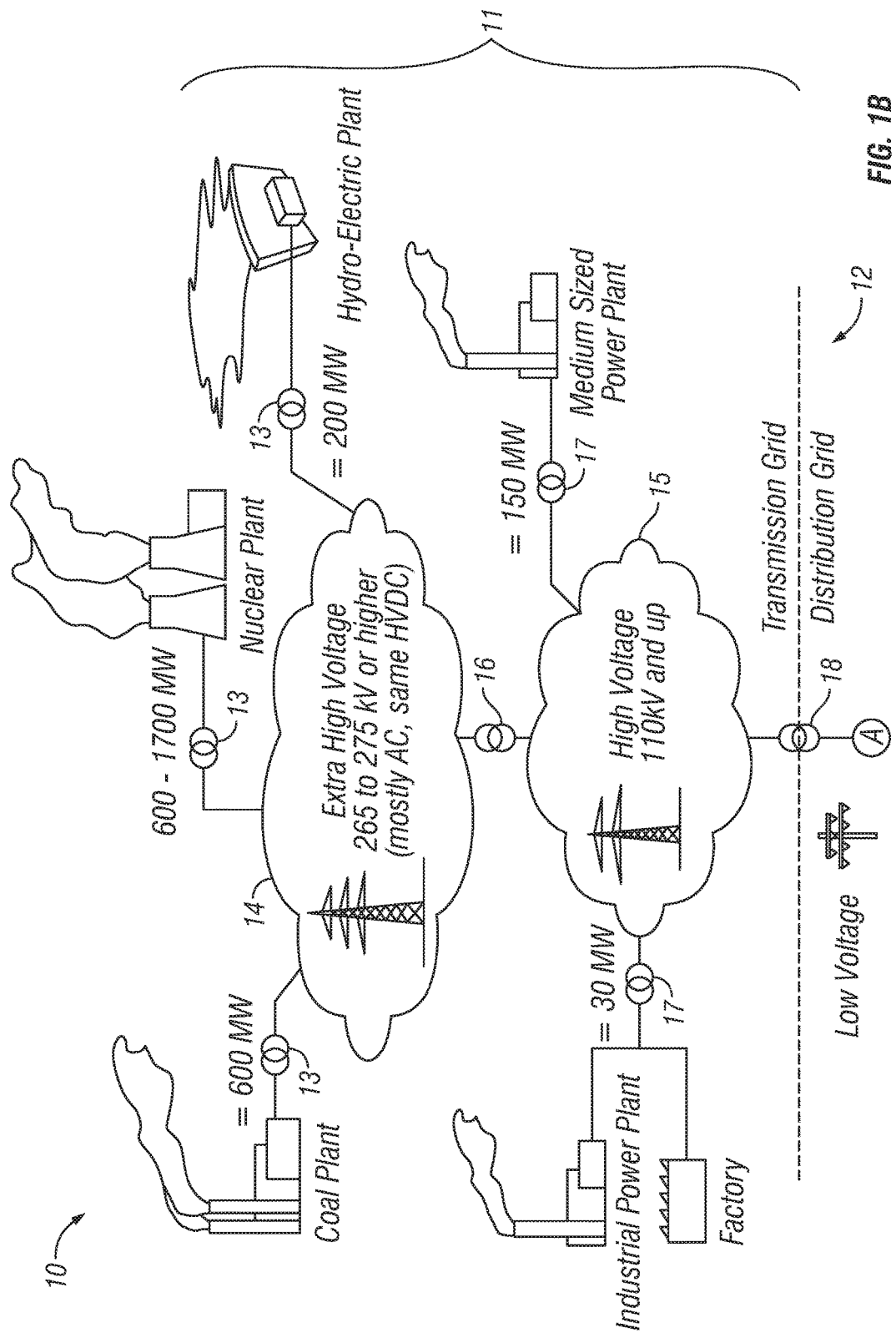
FIG. 1B is an enlarged partial view of FIG. 1A showing the transmission grid.
Figure 1C:
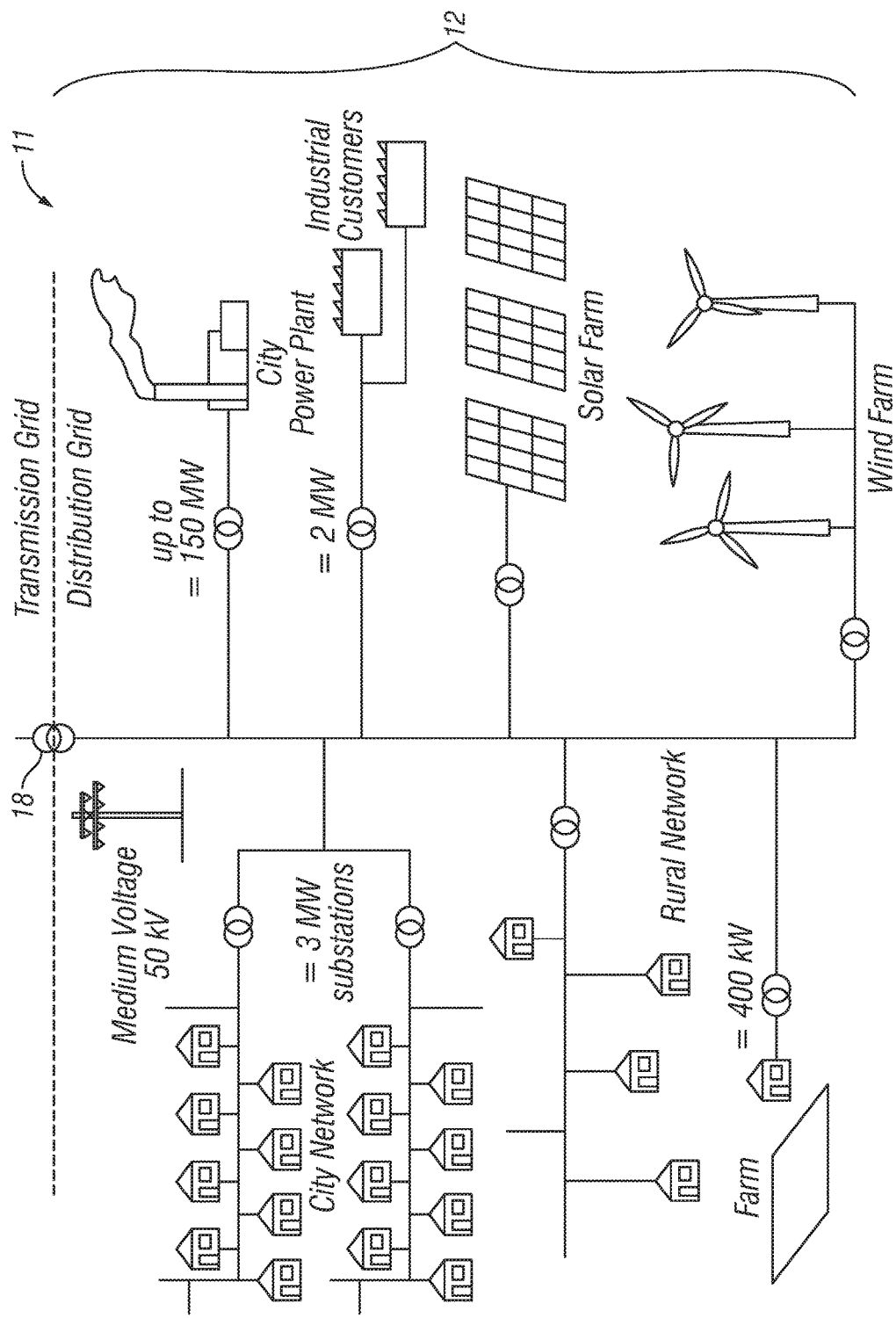
FIG. 1C is an enlarged partial view of FIG. 1A showing the distribution grid.
Figure 2:
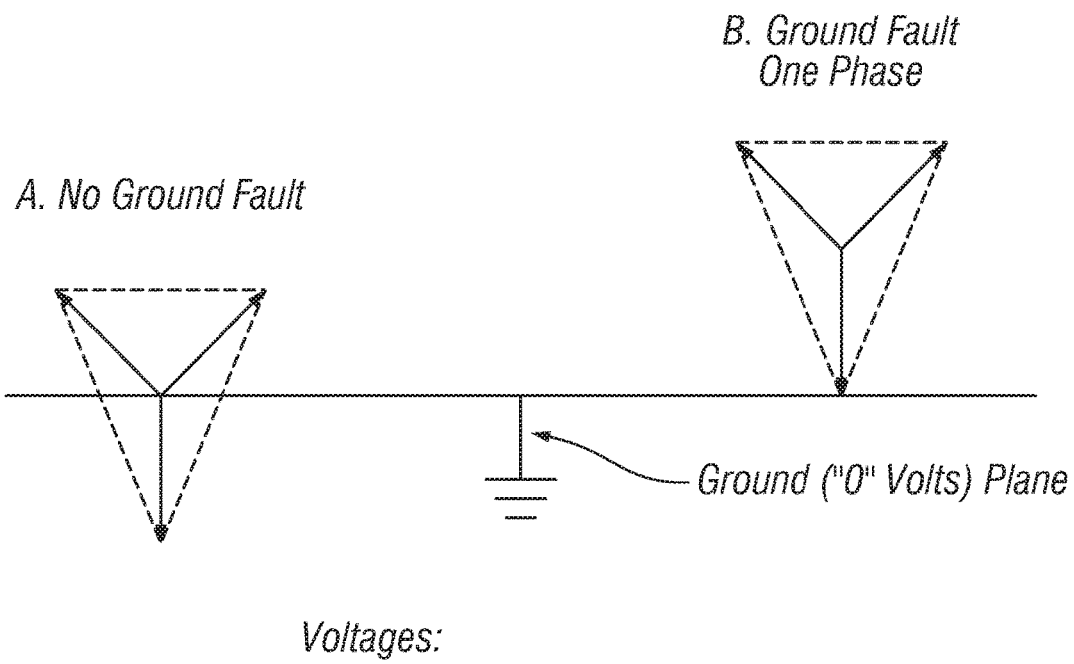
FIG. 2 illustrates typical fault conditions.

Referring to FIGS. 1A-1C, a generalized power distribution system 10 is shown which discloses various power system components at the grid level which supply power to individual consumers at the facility level. For purposes of this disclosure, the facility level includes industrial and factory facilities and the like, as well as residential facilities such as homes and apartment buildings. These structures include various types of power consuming devices or power consumers such as various types of equipment, motors and appliances. Stand-alone power consuming devices are also supplied by the power grid, such as street lighting, traffic signals, and other power consumers.

More particularly, the power distribution system 10 includes a transmission grid 11 at high voltage levels and extra high voltage levels, and a distribution grid 12 at medium voltage levels, which in turn supplies lower power at the facility level to residences, factories and the like. FIG. 1B shows various power supply sources which generate power at extra high voltages such as a coal plant, nuclear plant and a hydro-electric plant. These may supply power through step-up transformers 13 to an extra-high voltage transmission grid 14. This grid 14 may in turn connect to a high voltage grid 15 through a network of transformers 16, which grid 15 is connected to various grid facilities such as an industrial power plant, factory, or a medium sized power plant through respective networks of transformers 17. Generally, medium voltage refers to the range of 10 kV-25 kV or higher which is typically carried in the distribution grid and may include generation voltages, high voltage refers to the range of 132 kV-475 kV as might exist in the transmission grid, and extra high voltage is in the range of 500 kV-800 kV, which also is typically carried in the transmission grid. These grid level voltages are significantly higher than the low voltages present within a facility or other similar structure.

The transmission grid 11 may in turn connect to a medium voltage distribution grid 12 (FIG. 1C) through a network of transformers 18. In turn the residential grid 12 may include various facilities such as city power plants, industrial customers, solar farms, wind farms, agricultural farms, rural networks of residences or city residential networks. Various transformers 18 are provided to interconnect these components of the power distribution system 10. Generally, the present invention relates to a surge suppressor system which is installed at various locations within the power distribution system 10 to provide grid level surge suppression and thereby protect the various facilities supplied with power from the power distribution system 10. These various transformers may be of various types and configurations such as step-up and step-down transformers, as well as substation transformers installed in substations or delivery transformers which serve to supply individual customers.

Figure 3:
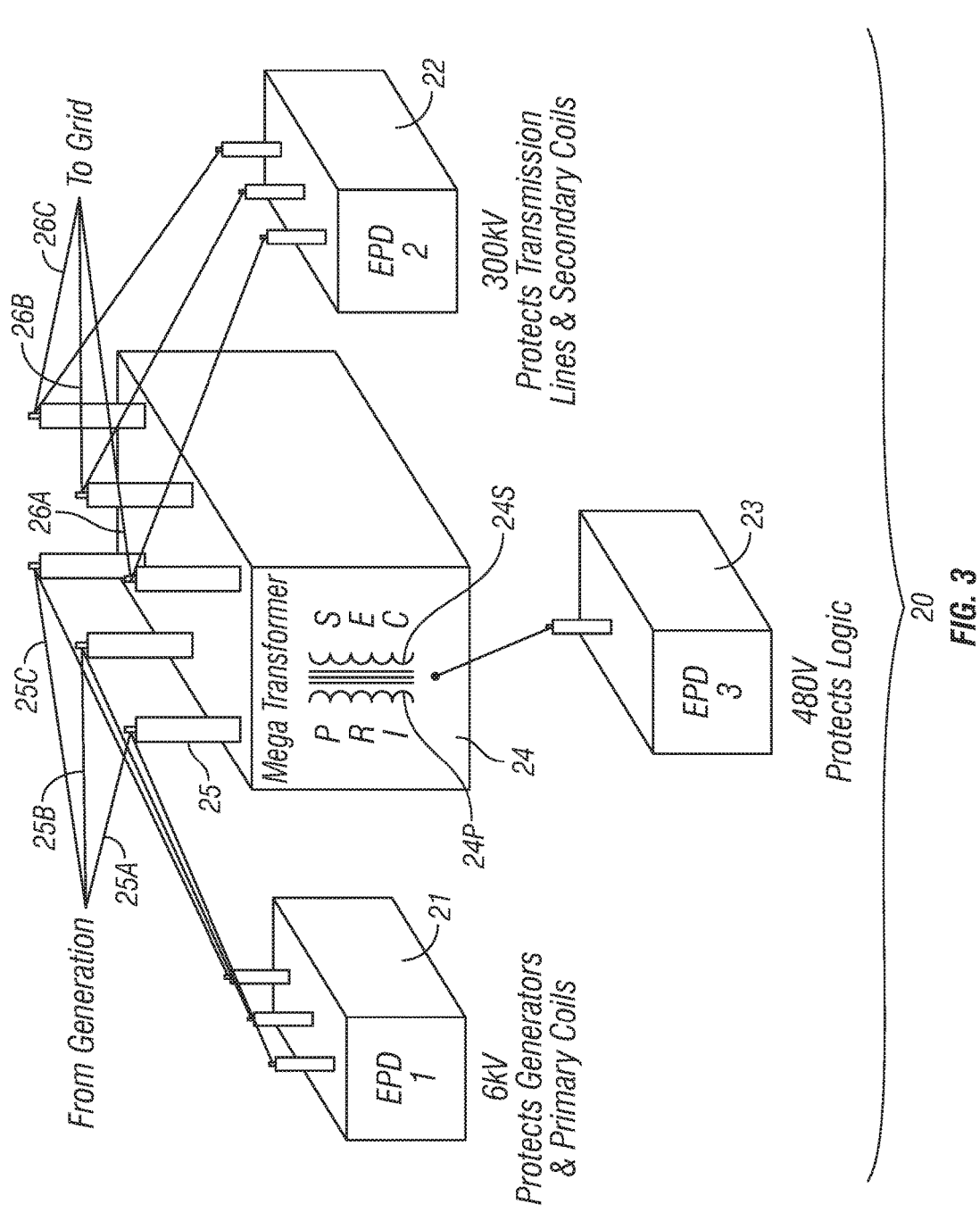
FIG. 3 diagrammatically illustrates a protection scenario (20) for grid level components (e.g. substations) at a grid level.

The invention relates to a system of voltage surge suppressor units 20 that are installed at various locations on the power distribution grid 10 to provide three-phase, grid level protection to various facilities which receive power from or supply power to such grid 10. FIG. 3 generally illustrates a system of multiple surge suppressor units 20 which are differentiated from each other in FIG. 3 by reference numerals 21, 22 and 23. These surge suppressor units 21, 22 and 23 are sized for the particular installation location and the voltage levels present within the power distribution system 10 at such locations. Generally, the power grid uses various transformers described above, with the representative grid transformer 24 of FIG. 3 being one of the various transformers used in the transmission grid 11 or distribution grid 12. The transformer 24 includes a primary side coil 24P which is connected to three power lines 25A, 25B and 25C which supply power, for example, from a generation plant or the like to the grid transformer 24. The transformer 24 includes a secondary side coil 24S which connects to transmission lines 26A, 26B and 26C for supplying power to downstream components of the power grid. In this exemplary embodiment, the transformer 24 steps up the power from 6 kV received from the generation side power lines 25A, 25B and 25C to 300 kV as supplied to the grid power lines 26A, 26B and 26C. It will be understood that voltages for the primary and secondary sides of the transformer 24 can vary depending upon the location within the power grid, wherein the voltage levels can be medium or high voltages.

The surge suppressor unit 21 connects to the generation power lines 25A, 25B and 25C and the primary side coil 24P to protect against the various transient conditions described above which thereby protects the primary coils 24P and the upstream power generators and any upstream grid components and equipment. The surge suppressor unit 22 in turn connects to the grid or transmission power lines 26A, 26B and 26C and the secondary side coil 24S to protect against the various transient conditions described above which thereby protects the secondary coils 24S as well as the downstream transmission lines 26A, 26B and 26C as well as any connected grid equipment and components. Also, the surge suppressor unit 23 may be a 480V unit or other suitable voltage level suitable to protect system circuitry and logic.

Figure 4:
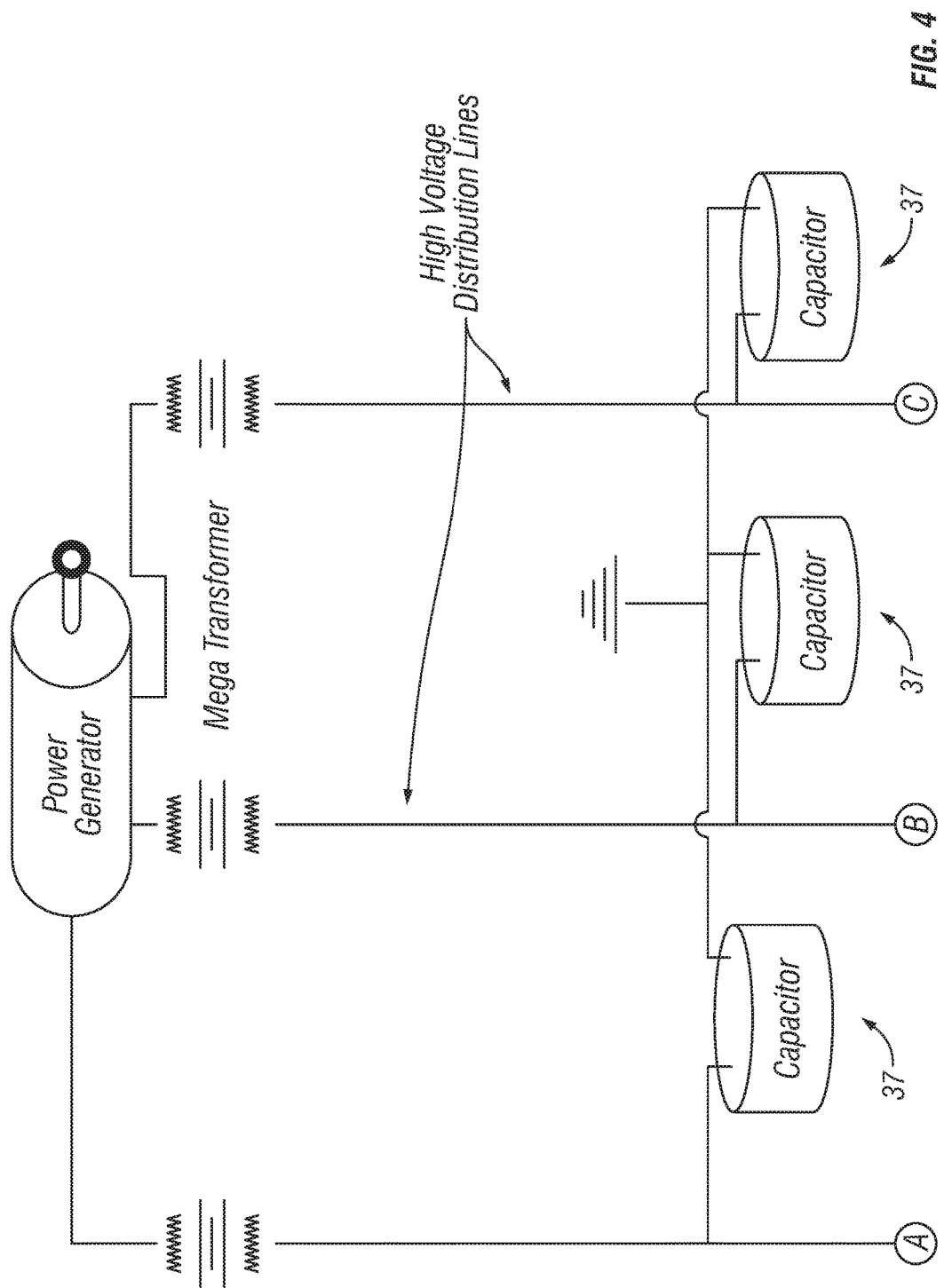
FIG. 4 illustrates a surge suppression unit (30) comprised of shunt-connected three phase transformer banks that is referenced as complete units (21, 22, and 23) on FIG. 3.
Figure 4:
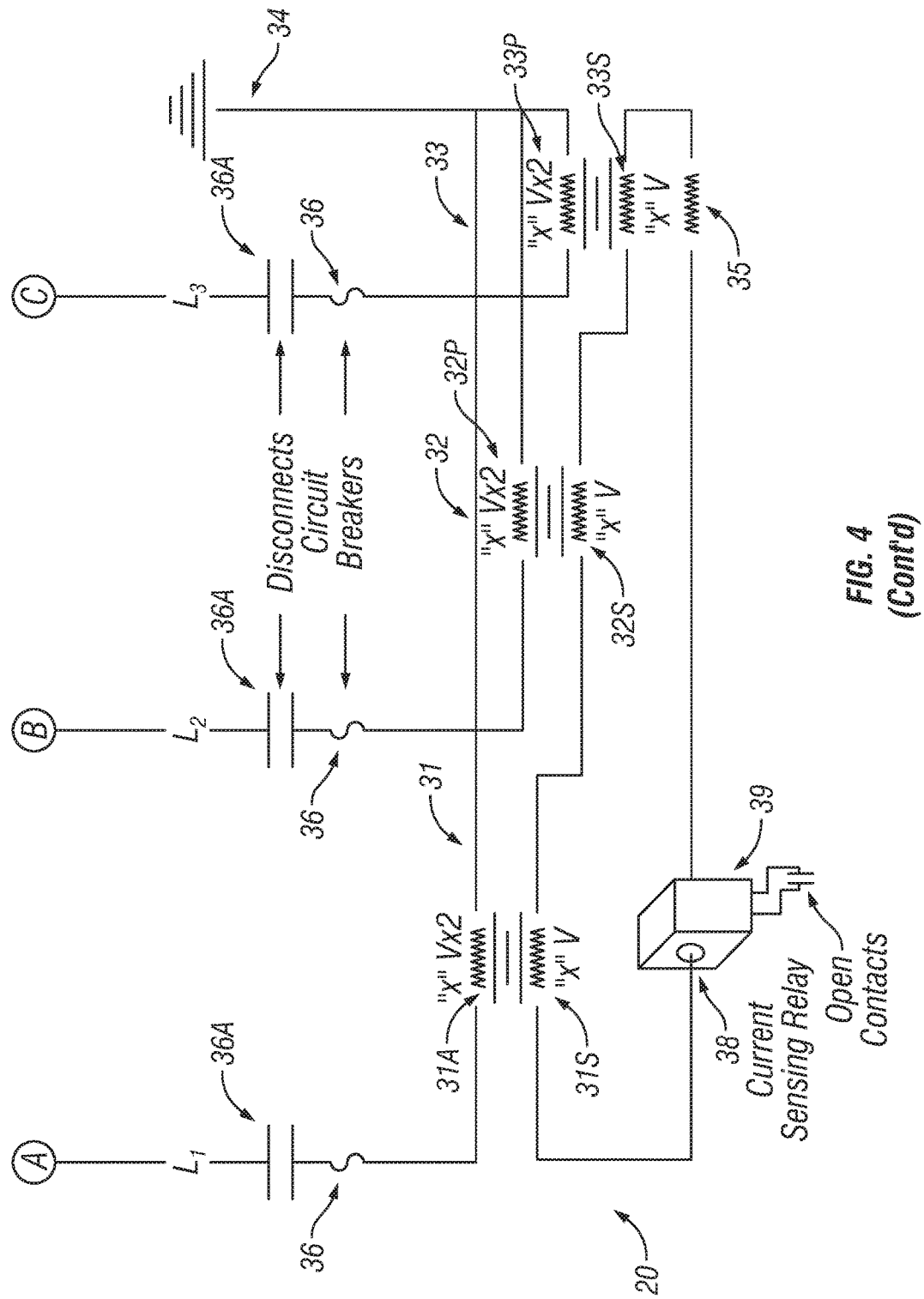

Referring to FIG. 4, each surge suppressor unit 21, 22 and 23 can generally use the design of the surge suppressor unit design 20 (FIG. 4) that comprises a series of shunt-connected three phase transformer banks 31, 32 and 33 that are designed to correct phase neutral voltage imbalances by feeding them back onto themselves and/or draining the imbalances off to the integrated resistor bank that is wired to the secondary side of the system as also shown in FIG. 4. Each transformer bank 31, 32 and 33 includes primary coils 31P, 32P and 33P which connect to and receive power from one of the power transmission lines L1, L2 and L3 of the system, which may be at the medium or high voltages present in the power grid. The primary coils 31P, 32P and 33P also connect to ground 34. The lines L1, L2 and L3 may for example be connected to transmission lines 26A, 26B, 26C (FIG. 3) and supplied by power generator and mega transformers shown in FIG. 4, or lines 25A, 25B, 25C in the example of FIG. 3.

Each transformer bank 31, 32 and 33 also includes secondary coils 31S, 32S and 33S which connect in series together and have a resistor 35 connected in series therewith. The series connected resistor 35 provides both noise filtering and a discharge path for energy during a power down whether intentional or caused by a natural occurrence. The resistor 35 also helps to drain system energy to prevent an arc-flash since an arc flash is a series phenomenon. By holding up the remaining phases during a fault, voltage buildup cannot form and simply allows circuit protection to open the circuit without a flashing event. This enhanced stability ensures cleaner electron flow and renders the flow safer for components and personnel alike. In other words the surge protection unit 30 balances the voltage on the "load" side. Since the flash is inherently on the "source" side, the voltage across the arc is minimal and the arc will be suppressed.

Each surge suppressor unit 20 utilizes a circuit breaker 36 governing power from each of the lines L1, L2 and L3 that can be programmed to rapidly reset and can be made scalable to medium and high voltage requirements. The circuit breaker 36 also may be manually operated for installation and replacement of the surge suppressor unit 20, or another switch device could be included to provide manual switching of the surge suppressor unit 20. Depending of the requirements of the utility organization, added protection, in the form of Metal Oxide Varistors, can be series piped in as a secondary circuit as severe over voltage occurs.

With this construction, the surge suppressor unit 20 thereby balances phase voltages with respect to ground by pushing clean phase shifted current into the phase with the lowest phase voltage. The components preferably are matched single phase transformers 31, 32 and 33 and in this permanent solution are sized to the voltage class and kVA in which the particular surge suppressor unit 20 will be employed. The voltage specification determines the appropriate turn ratios needed to properly size each surge suppressor unit 30 to its installation location. All three transformers 31, 32, and 33 are spaced from one another by IEEE standards to prevent arcing or magnetic flux between each phase. Depending on the specific requirements, the surge suppressor units 20 of the invention may utilize underground installation with oil/coolant immersed resistor banks 35 and oil cooled transformers 31, 32, 33. These options would allow for closer spacing (smaller footprint) and require less mechanical or free air cooling. These options would also remove equipment from line of sight hostilities.

During installation, each surge suppressor unit 20 is wired in parallel to the power system, for example, as seen in FIG. 3. Further, a surge suppressor unit 20 such as unit 22 in FIG. 3 may protect from the secondary side 24S of a power transformer 24 to the primary side of the downstream transformer to provide extended protection extending from the surge suppressor units 20 to other power components connected thereto. For example, a surge suppressor unit 20 may protect from the secondary side of an LPT down to the primary windings of the next step down transformer. Additional surge suppressor units 20 would be installed on the next portion of the stepped down power system beginning with the secondary of that distribution transformer down to the primary on the next transformer and so on. Each surge suppressor unit 20 would be engineered and constructed to operate with the hookup voltage and the VA rating of the transformer it is designed to protect, such that different sized and rated surge suppressor units 20 would be installed in the power grid depending upon the location of installation. This extended protection is also true from the generation source to the primary side 24P on the initial transformer 24 which is protected by the surge suppressor unit 21 in FIG. 3. All connected components would be protected, and the surge suppressor unit 20 of the present invention would stabilize imbalances whether caused by downstream activity or directly on line.

Further, no power system would need to be turned off to connect the surge suppressor units 20. The circuit breaker 36 or other suitable disconnect device 36A can be manually operated such that utility linemen could hot tap the surge suppressor devices 20 into the system and then engage each surge suppressor unit 30 by using the disconnect switch 36A.

This system of surge suppressor units 20 provides power factor correction (PFC) by optionally introducing power regulating products (e.g. capacitors 37) to help streamline the power current making the energy more efficient.

Figure 5:
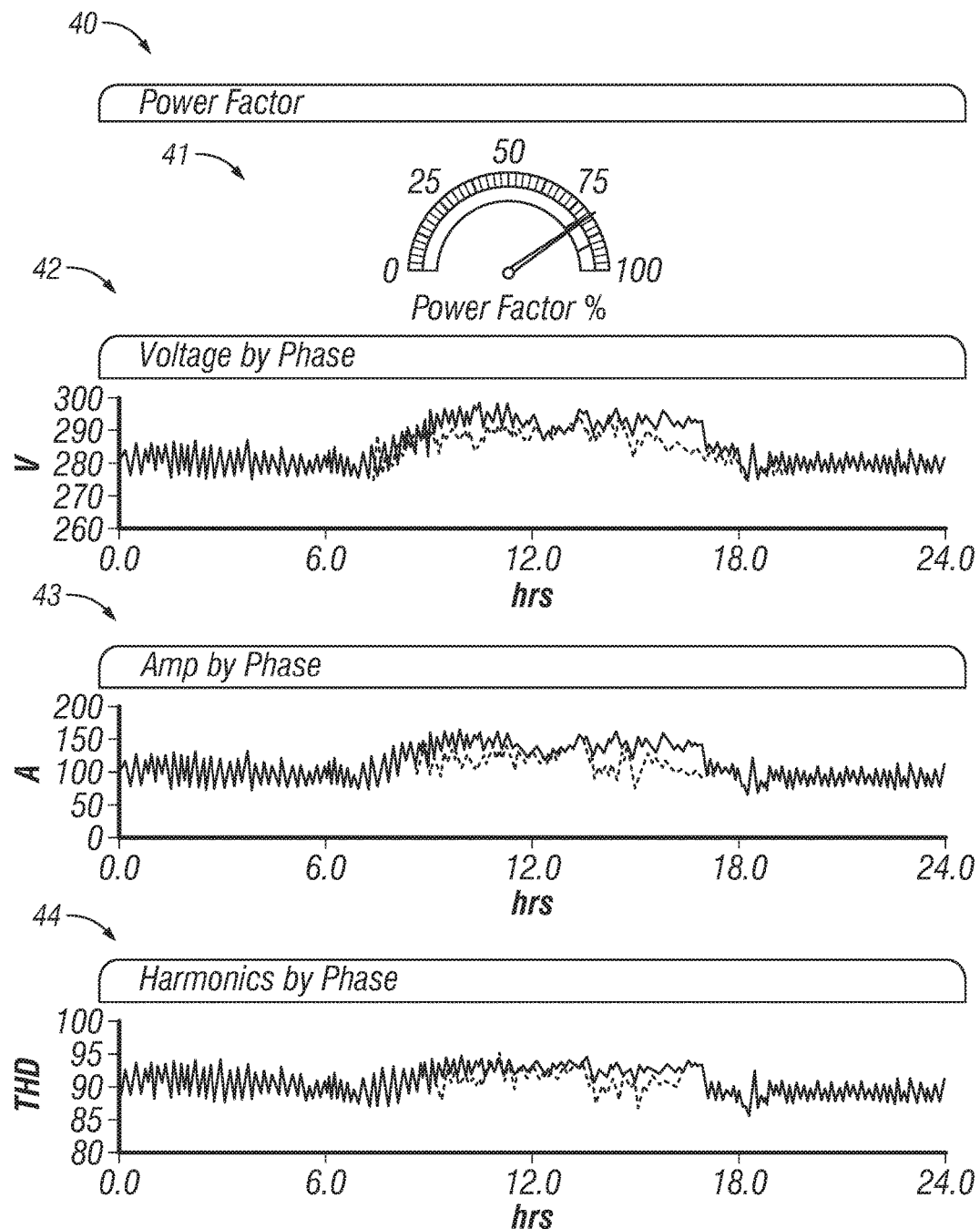
FIG. 5 illustrates a remote monitoring system.

Preferably, the surge suppressor unit 20 (FIG. 4) also includes one or more appropriate sensors 38, which preferably include a current sensor. The sensor 38 connects to a control system 39 for detecting and monitoring the sensor 38. The control system 39 may also include remote (web-based) diagnostic and reporting features such as that shown in the data display 40 of FIG. 5. The data display 40 may be located remote from the various surge suppressor units 40 for monitoring by utility personnel, such as through a computer terminal. The data display 40 preferably shows information regarding faults (imbalances) that are proactively communicated and can be monitored from off-site locations. The data display 40 includes several display graphs 41, 42, 43 and 44 which can display various types of data. This real time status reporting would provide significant information and data including but not limited to:

---

Voltage by phase
Amps by phase
Harmonics by phase
Oil/Coolant Temperature
Ground fault indicator (by phase and the severity of each occurrence).

The control system 39 may include alarms for every data point, which alarms could be customizable so as to trigger utility response to multiple remote locations. This is critical with grid level power substations that are often un-manned and/or in remote settings. Every data point can be captured, stored, and maintained with data storage means within the control system 39 for historical tracking and reference so as to allow for both historical trend analysis and specific search capability.

Focusing on voltage allows the invention to address each of the 5 Common Power Issues discussed above. Transients are the brief voltage spikes that occur regularly and may last only a few cycles. The inventive system would take the surplus voltage in the same waveform and electromagnetically feed it back on itself with the same intensity through the transformers 31, 32 and 33. Even with a power analyzer one could see that disturbances placed directly on line are completely mitigated.

Interruptions have many causes but the damage occurs in the brief moments as a system loses power and motors which wind down turn into mini generators sending inappropriate voltages to connected loads. The system of the invention would not prevent sustained power losses but would prevent damage to loads by allowing a softer landing should an outage occur due to the interaction of the transformers 31, 32 and 33 and the resistor 35.

The invention will also reduce the harmful effects of voltage instability like sags and swells or under/over-voltage at a grid level. The primary sides 31P, 32P and 33P of the transformers 31, 32 and 33 and their adjoining secondary sides 31S, 32S and 33S constantly stabilize the voltage discrepancy. If there is a sustained swell, the excess power is harmlessly drained off to the integrated resistor bank 35 that is series wired on the secondary side of the system.

Waveform and frequency variations might best be described as noise on the line from massive magnetic forces. These magnetic hits to the grid can cause damage to generators, transformers, auto tapping devices, and connected loads throughout. High frequency noise from hostile EMPs change the normal 60 Hz flow of electrons which may wreak havoc on infrastructure. Depending on the severity or proximity to such hostilities, damage could range from loss of end user electronic devices to the overheating of the stators on utility generation plants or power transformers. The surge suppressor units 20 of the present invention would act as a gatekeeper, suppressing any frequency above or below the 60 Hz range. Damage to grid components could occur in an instant without the system of the present invention but since it operates only on 60 Hz waveforms it routs the inappropriate waveform to the integrated resistor bank 35 at the exact speed of the infraction. The invention, therefore, rectifies disturbances that are out of specification and harmonizes everyday activity.

The system of the present invention provides significant advantages over prior surge suppressor devices. For example, the system of the present invention is designed for medium and high level voltages with a targeted application for grid system protection. Many prior surge suppression devices were designed for low voltage systems such as an industrial or residential setting that are self-contained which have no "cascading" issues or additional sources of power to be concerned about. The present invention can accommodate the unique requirements of the power grid.

Further, each surge suppressor unit 20 does more than protect a single device. Rather each of the surge suppressor units 20 is wired in parallel at appropriate locations on the power grid to protect both sides of grid level substations, power delivery systems, and generation plants. FIG. 3 provides an exemplary illustration of the extended protection provided by individual surge suppressor unit.

Further, the provision of a circuit breaker 36 and disconnects 36A in the surge suppression units 20 allows the invention to be scaled to medium and high voltage grid systems and facilitates hot tapping of each unit 20 during installation or replacement. The surge suppressor unit 20 also allows for the inclusion of Metal Oxide Varistors, which can be series piped in as a secondary circuit, to add specific grid level protections for severe over-voltages.

More particularly, a surge suppressor device according to this design has been tested at defined voltage levels under conditions representing an EMP of varying wavelength/shape and frequencies directly on line through injection. This testing was conducted with resistive and inductive loads using Mil-spec 188-125-1 and Mil-Std-2169 test standards and equipment to represent grid level protection. Thousands of volts were injected into a surge suppressor unit designed according to surge suppressor unit 20 described above and a connected power system wherein threat pulses were identified, clamped and drastically reduced every time through multiple individual test events. FIGS. 6-9 illustrate test data from such tests.

Generally as to an EMP such as a nuclear generated EMP, such pulses are considered to include three pulse components commonly designated as E1, E2 and E3. The E1 component is considered to be the quickest and can induce high voltages in an electrical system. The E2 component is an intermediate pulse beginning at a short time after initiation of the electromagnetic pulse and ending soon thereafter. This pulse is considered to be similar to a lightning strike but of a lesser magnitude. The E3 pulse component is longer and slower and is considered most similar to a solar flare. The E3 pulse component is the most troublesome component to deal whether it is generated by a nuclear EMP or a solar flare, and current technologies do not handle the E3 pulse component and suitably protect grid systems.

In EMP testing of the present invention, the surge suppressor unit 20 has shown to handle and protect against all three pulse components, namely E1, E2 and E3. The surge suppressor quickly clamps on EMP pulse threats within millionths of a second and reduces the severity of the threat to safe levels. For example, the unit mitigated the E1 pulse instantaneously and eliminated the threat within 1.3 μsecs, the unit mitigated the E2 pulse instantaneously and returned the phases to "normal" within 0.002 seconds, and the unit also mitigated the E3 pulse instantaneously and returned the phases to "normal" within 0.002 seconds. The same device continued to operate throughout all tests and suffered no damage such that it can be installed and performs through multiple EMP events.

Figure 6:
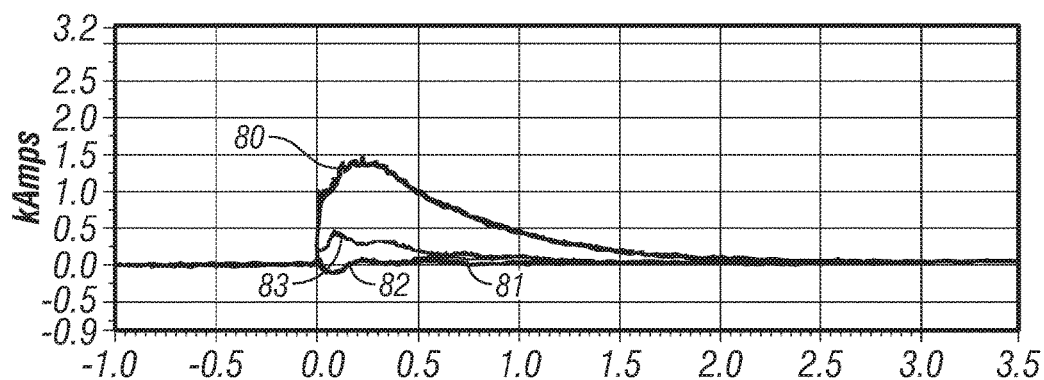
FIG. 6 is a graph showing test results of a surge suppressor unit installed on a three phase circuit when subjected to an E1 EMP pulse component.

FIG. 6 illustrates a graphical representation of the test results for the three phases and their reaction to the injected E1 pulse which was injected under test conditions recreating such a pulse component. This graph compares the kAmps detected in the system phases against the time measured in μseconds with pulse initiation at time 0. FIG. 6 shows the E1 pulse injection test from time −1.0 to 3.5 μsecs. The surge suppressor unit was connected to a three phase circuit wherein the system under normal operating conditions was a 480 v operating system with 6000 watts of load. The test injected 20,000 volts at 1500 Amps to simulate an E1 waveform. The height of the threat pulse 80 maxes out at nearly 1500 Amps (1.5 kA) on a single phase and lasts for over 1.9 micro seconds. The threat pulse 80 is injected onto the operating system, and the pulse is shown with a sudden spike with a diminishing tail. The darker Phase A load 81 and the lighter colored Phase B load 82 create an immediate dip to help correct the imbalance or resultant E1 spike on the Phase C load 83. The Phase C carried the wave from the injected load, but mitigates the impact by pushing the load back on to Phases A and B. Phases A, B and C of the surge suppressor unit have compensated for the threat pulse by correcting the wave against itself or in other words balances the pulse against the other two phases creating a real time correction that can be seen in the graphs. As a result, the surge suppressor unit immediately mitigates the surge and begins reducing the magnitude and width within 0.1 μsec. The threat is kept to less than 500 amps at its peak as is reduced to below 250 Amps within 0.2 microseconds (70% reduction in amplitude). By reducing the height (magnitude/amplitude) and the width (duration) by such a wide margin, the surge suppressor renders the E1 threat harmless to the grid components. The threat is completely eliminated by 1.3 μseconds.

Figure 7:
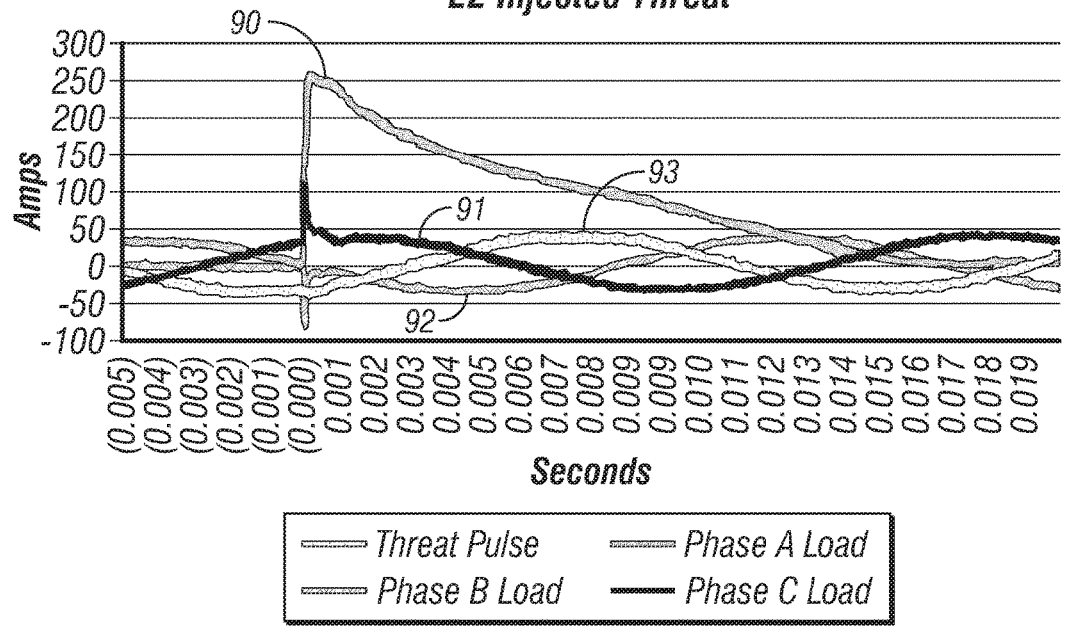
FIG. 7 is a graph showing test results of a surge suppressor unit installed on a three phase circuit when subjected to an E2 EMP pulse component.

FIG. 7 shows the graphical results of the surge suppressor unit responding to an injected E2 threat. The threat pulse is shown as graph line 90 wherein the threat pulse is injected onto Phase C shown by line 91 at approximately 5 kV with a 6 kw load being present. The pulse is shown as a sudden spike with a diminishing tail. The Phase A load 92 and Phase B load 93 create an immediate dip to help correct the imbalance on the Phase C load 91 which exhibits a spike. Phase C 91 is already mitigating the impact by pushing the load back onto Phase A 92 and Phase B 93. Phase C 91 peaks at 109 Amps compared to the 260 Amp peak of the threat 90. All three phases are corrected and back in phase within 0.002 seconds from the initial threat being injected on the line. All three phases 91, 92 and 93 are in alignment prior to the threat 90 being injected at time 0. All three phases are back in phase very quickly from the initial E2 threat being injected on the line. Therefore, the surge suppressor unit also can readily handle the E2 pulse component or a pulse exhibiting similar characteristics.

Figure 8:
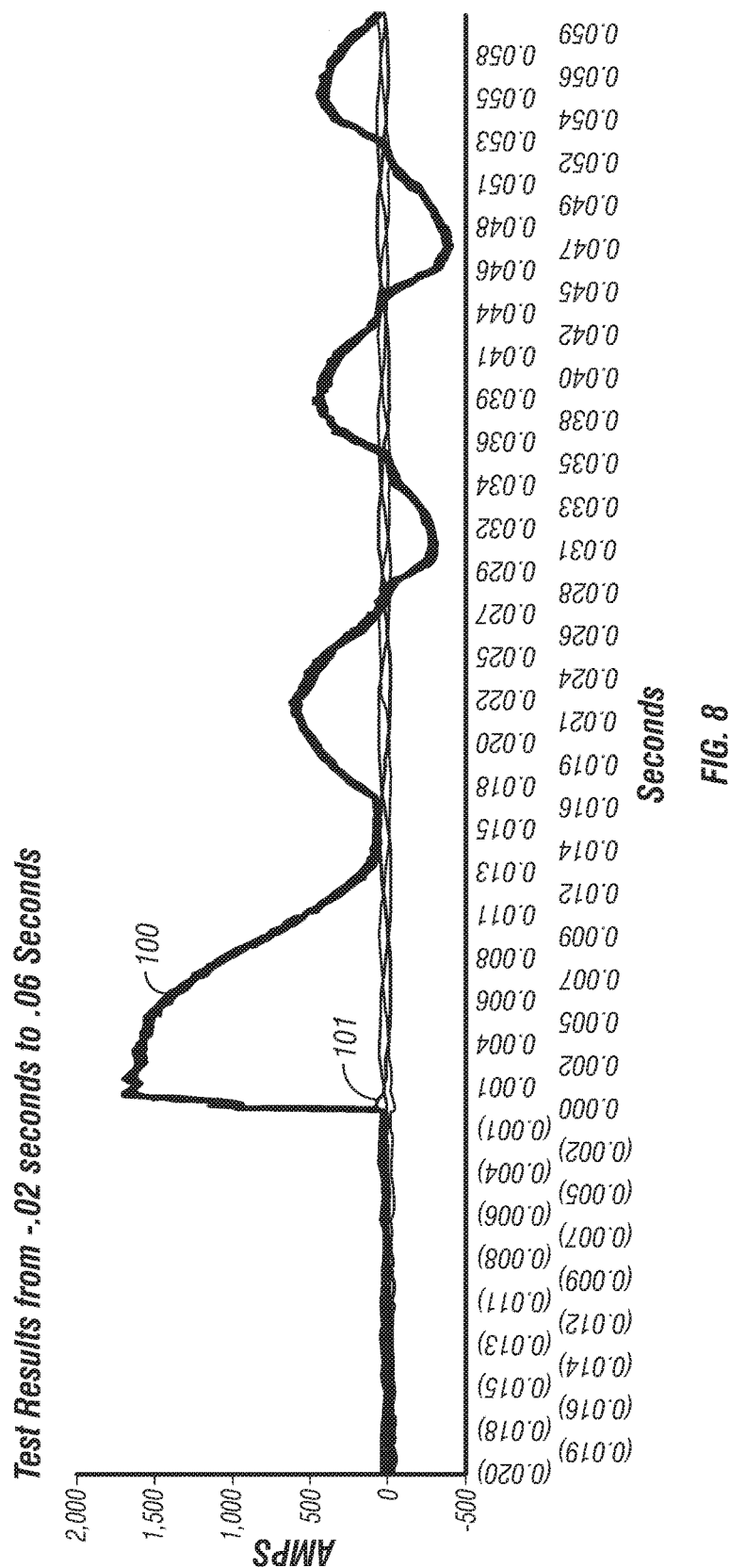
FIG. 8 is a graph showing test results of a surge suppressor unit installed on a three phase circuit when subjected to an E3 EMP pulse component.
Figure 9:
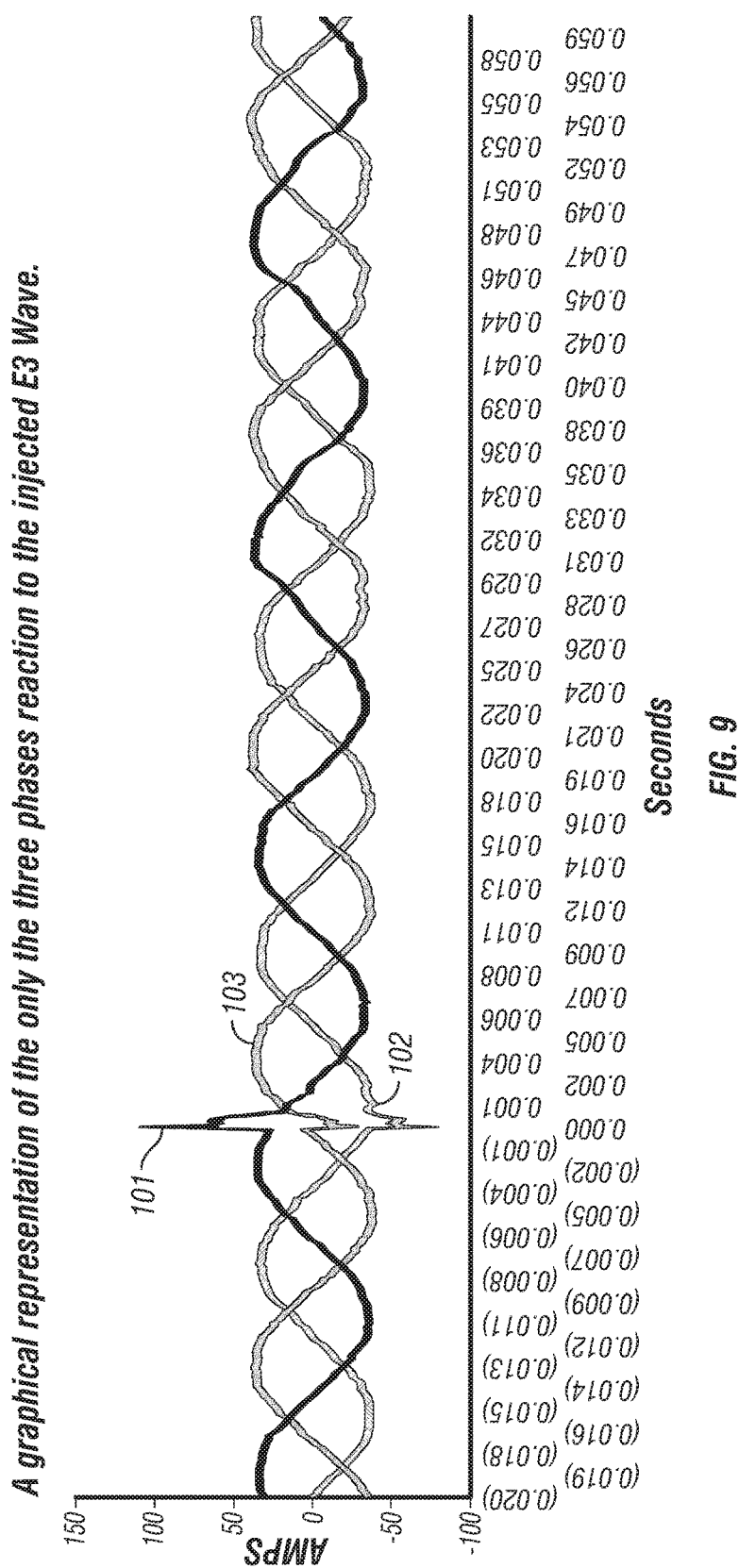
FIG. 9 is a graph showing test results of a surge suppressor unit installed on a three phase circuit when subjected to an E3 EMP pulse component with the threat pulse removed.

The surge suppressor unit was also tested under an E3 pulse component which is shown in FIGS. 8 and 9. FIG. 8 shows the graphical results with the threat pulse 100 injected onto Phase C 101 at approximately 2 kV with a 6 kw load. The threat pulse is clearly shown in FIG. 8 with a sudden spike and corresponding waves. Due to the scale of the graph in FIG. 8, the reaction of the phases is not entirely clear. As such, FIG. 9 is provided with the threat pulse 100 omitted so that the scale of the system phases can be increased for clarity. As seen in FIG. 9, Phase C 101 has an immediate spike. However, the Phase A load 102 and the Phase B load 103 create an immediate dip to help correct the imbalance on the Phase C load 101. Phase C already mitigates the impact of the threat pulse 100 by pushing the load back on to Phase A 102 and Phase B 103. Phase C 101 peaks at 109 Amps compared to the 1710 Amp peak of the threat pulse 100. All three phases 101, 102, and 103 are corrected and back in phase within 0.002 seconds from the initial threat pulse 100 being injected on the line. All three phases are in alignment prior to the threat pulse 100 at time zero, and back in alignment within 0.002 seconds, such that the surge suppressor can readily handle the E3 pulse component.

As such, the inventive surge suppressor system can prevent the need to shed load in the presence of E3 activity or solar flare activity on the grid by correcting the flattening of the AC waveform. By maintaining 3 perfectly balanced phases where the vectors are 120 degrees out of phase, the surge suppressor eliminates the need to reduce LPT loads to prevent overheating and damage from half cycle saturation.

Preferably, the surge suppressor unit never routes surplus energy from these electromagnetic forces to ground, and instead, said energy is thrown against the incoming surge at the speed of the infraction. Much like a mirror instantaneously rebounds a beam of light, the surge suppressor system rebounds pulse threats to mitigate the inrush of power regardless of the magnitude.

The surge suppressor system can be installed nearly anywhere within the power distribution grid and still protect the entire portion of the circuit. This means a surge suppressor unit could be installed midway between the LPT and the next step down transformer which eliminates the need for a new piece of equipment in an already crowded space at the power source.

Although particular preferred embodiments of the invention have been disclosed in detail for illustrative purposes, it will be recognized that variations or modifications of the disclosed apparatus, including the rearrangement of parts, lie within the scope of the present invention.

The invention claimed is:

1. A surge suppression system of a power distribution system of a power grid which provides power to low-voltage power consumers, comprising:
   at least one three phase system transformer of said power distribution system having a primary side which receives three phase power from a power source through a first set of power distribution lines, and a secondary side, which supplies three phase power downstream through a second set of power distribution lines, said primary and secondary sides including respective primary and secondary side coils to transform said three phase power from a first voltage on said primary side to a second voltage on said secondary side different from said first voltage, said system transformer stepping said first voltage up to or stepping said first voltage down from one of a lower voltage or a higher voltage;
   at least one surge suppressor unit connected, via respective direct electrical connections and in immediate physical proximity to said system transformer, in a shunt connection to at least one of (i) said first set of power distribution lines on said primary side of said system transformer and (ii) said second set of power distribution lines on said secondary side of said system transformer, each surge suppressor unit comprising a plurality of transformer banks which correct disruptions resulting from voltage surges due to an electromagnetic pulse ("EMP") or geomagnetic disturbance ("GMD") through said first set of power distribution lines or said second set of power distribution lines, each of said plurality of transformer banks including (i) a respective primary coil which connects to and receives said respective phase of said three phase power received from said power distribution system and (ii) a respective secondary coil which connects in series together with a secondary coil of each other of said plurality of transformer banks and has a resistor connected in series therewith to drain energy from a surge, wherein said plurality of transformer banks transform said three phase power from said first voltage or said second voltage of said system transformers to three phase power at a third voltage; and
   at least one sensor configured to detect information associated with an operation of each surge suppressor unit.

2. The surge suppression system according to claim 1, wherein said at least one sensor is in communication with at least one of a data display, a diagnostics system, and a control system.

3. The surge suppression system according to claim 1, wherein said information associated with said operation of each surge suppressor unit is at least one of (i) phase, (ii) current, (iii) voltage, and (iv) harmonics content.

4. The surge suppression system according to claim 2, wherein said at least one of a data display, a diagnostics system, and a control system are external to said at least one surge suppressor unit.

5. The surge suppression system according to claim 2, wherein said data display displays a plurality of various data associated with said detected information, said data including at least one of (i) voltage by phase, (ii) amps by phase, (iii) harmonics by phase, (iv) oil or coolant temperature, and (v) ground fault indicator.

6. The surge suppression system according to claim 2, wherein said data display displays said data in real-time.

7. The surge suppression system according to claim 2, wherein said control system includes at least one alarm configured to trigger a utility response at a location remote from said at least one surge suppressor unit.

8. The surge suppression system according to claim 2, wherein said control system includes data storage, and wherein said control system is configured to store said detected information within said data storage.

9. The surge suppression system according to claim 1, wherein said surges are also due to at least one of (i) harmonics in said three phase power, (ii) a voltage swell, (iii) a voltage sag, and (iv) a line fault.

10. The surge suppression system according to claim 1, wherein said surge suppressor units are sized to a voltage class and kVA associated with a respective primary side or secondary side voltage of said system transformer to which said surge suppressor units are connected.

11. The surge suppression system according to claim 1, wherein said primary coils of said surge suppressor units are connected to ground, and said secondary coils of said surge suppressor units are ungrounded.

12. The surge suppression system according to claim 1, wherein said first voltage is higher than said second voltage.

13. The surge suppression system according to claim 1, wherein said first voltage is received from a power generator which generates said three phase power for said power grid.

14. The surge suppression system according to claim 9, wherein said surges are created by an EMP comprising at least one of E1, E2, and E3 pulse components, and said surge suppressor units counterbalance any of said E1, E2, and E3 pulse components of said electromagnetic pulse.

15. The surge suppression system according to claim 1, wherein said first set of power distribution lines includes first, second, and third power distribution lines, and said second set of power distribution lines includes fourth, fifth, and sixth power distribution lines.

16. The surge suppression system according to claim 1, said surges having voltages and/or currents exceeding normal operating levels by at least ten times.

17. The surge suppression system according to claim 1, wherein the at least one surge suppressor unit is connected to said second set of power distribution lines between said secondary side of said system transformer and at least one other three phase system transformer.

* * * * *